Dec. 16, 1941.     W. H. NEWELL     2,266,237
IRREVERSIBLE DRIVE
Filed May 23, 1940

INVENTOR.
WILLIAM H. NEWELL
ATTORNEY.

Patented Dec. 16, 1941

2,266,237

UNITED STATES PATENT OFFICE 2,266,237

IRREVERSIBLE DRIVE

William H. Newell, New York, N. Y., assignor to Ford Instrument Company, Inc., Long Island City, N. Y., a corporation of New York Application May 23, 1940, Serial No. 336,709

9 Claims. (Cl. 192—7)

This invention relates to transmissions which include a locking device to prevent the load from overpowering the power unit and turning the transmission backward. Locking devices for this purpose are commonly employed in connection with transmissions which have but one direction of rotation, but a characteristic of the present invention is the fact that the locking device will permit of rotation of the driven member by the power unit in opposite directions.

For this purpose the invention contemplates a double acting locking device that is controlled by the torque reaction of the driven member and is ineffective when the direction of rotation of the driven member is opposite to the direction of the torque, but becomes effective when the reaction overpowers the driving force and produces rotation of the driven member in the direction of the torque.

The invention may, for example, be embodied in the form of a brake drum on the driven shaft or a shaft operated thereby, together with a pair of oppositely directed brake shoes alternatively cooperative with the drum and carried by an arm the position of which is controlled by the torque reaction on the driven shaft. Preferably centralizing spring means will hold the arm in position with both shoes out of contact with the drum for normal reaction but will be overcome by excessive reaction and will allow one or the other shoe to contact the drum. The bias of the arm will be such as to tend to bring that shoe against the drum the inward movement of which is against the direction of movement of the drum surface at the area of contact. When the drum is reversed by an overpowering torque the shoe engages the drum surface and is drawn tightly into contact therewith by reason of reversal of the direction of movement of the drum surface. When the drum is driven in the opposite direction by the driving member the other drum shoe functions in the same manner.

Most effectively the brake shoes may be in the form of wedges, that is, may be double faced and disposed in coacting relation to two adjacent and oppositely rotating drums. With such construction the shoes become wedged between the two drum surfaces and function positively and quickly to check any backward rotation.

The specific embodiment of the invention shown in the accompanying drawing will now be described.

Figure 1:
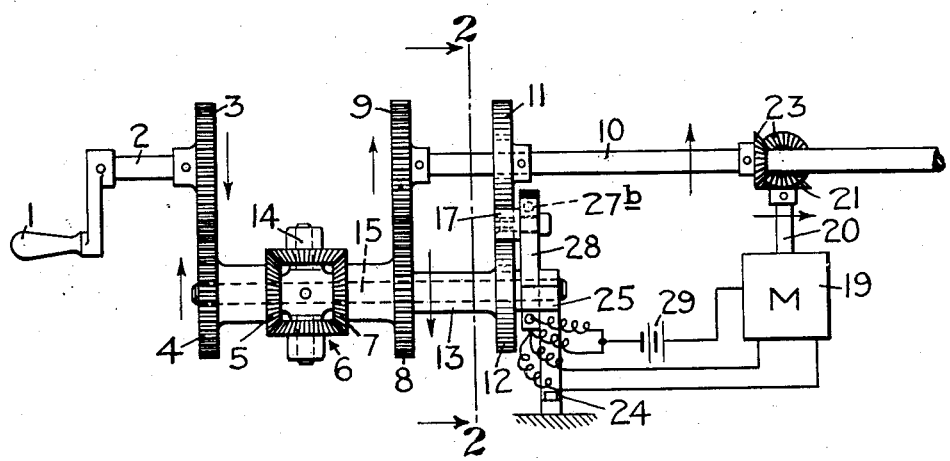
Fig. 1 is a diagrammatic illustration of a transmission embodying the invention.

In the illustrated construction the driving member is a hand crank 1 but obviously can be any form of prime mover, manual or automatic. The crank drives shaft 2 of gear 3 which meshes with gear 4 axially connected with the bevel gear 5 forming one side of differential 6. The other side 7 of the differential is axially connected to spur gear 8 meshing with gear 9 on driven shaft 10.

Secured on shaft 10 is drum 11 which is disposed in the same plane with and adjacent to drum 12 on hollow shaft 13 rotatively secured to and in axial alignment with gear 8. The center or spider 14 of differential 6 is connected by shaft 15 which bears within the hollow shaft 13 to a triangular arm 16 in a plane parallel with and adjacent to the drums. The apex of the triangular arm is down and on the two upper corners are attached wedge shaped shoes 17 and 18, the wedge surfaces of which are arcuate and disposed between the adjacent drum surfaces.

As shown, power amplification may be had by means of a servo motor 19 the circuit of which is controlled by the spider 14 through the arm 16. The motor shaft 20 is geared to transverse shaft 22 through bevel gears 21, and shaft 22 is geared to driven shaft 10 by bevel gears 23.

Figure 2:
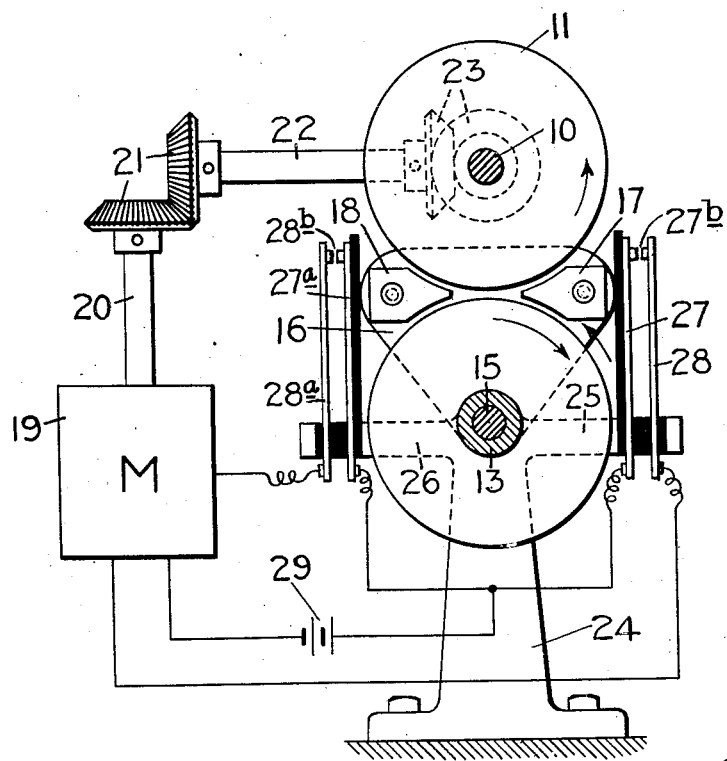
Fig. 2 is an enlarged section of the same on line 2—2 of Fig. 1.

The standard 24 on which is the bearing for the outer end of the shaft 15 has two lateral arms 25 and 26 near the outer end of each of which and insulated therefrom are a pair of upstanding spring arms forming a pair of electrical contacts, the inner arms being numbered 27 and 27a and the outer arms being numbered 28 and 28a. The spring arms 27 and 27a contact through insulating backing strips with the upper corners of the arm 16 and tend to hold it centralized with the shoes 17 and 18 out of contact with the drums 11 and 12. When so centralized the respective electrical contacts 27b and 28b are open. A rotation of the arm 16 clockwise as shown in Fig. 2 will close contact 27b, and a rotation counterclockwise will close contact 28b. The contact strips 27, 28, 27a and 28a are connected to the motor 19 through a source 29 of electrical energy in such maner that the closing of contact 27b will rotate the motor in one direction and the closing of contact 28b will reverse the direction of rotation.

In operation, the turning of the crank 1 in the direction of the arrow will rotate the side 5 of the differential in the opposite direction, as indicated. The gear 8 and hence the side 7 being fixed, the spider 14 will tend to rotate shaft 15 in a counter-clockwise direction as seen in Fig. 2 and will close contact 28b and start the servo motor 19 which through shafts 20 and 22 will operate the driven shaft 10 and hence the gears 9 and 8 in the directions indicated by the arrows, and the side 7 of the differential and restore the spider and arm 16 to central position as soon as the crank 1 stops rotation. Rotation of the crank 1 in the opposite direction will similarly close the contact 27b and through the motor 19 produce rotation of the shaft 10 in a direction opposite to that indicated by the arrow. Under these circumstances the brake shoes 17 and 18 are ineffective.

Regardless of whether the power to drive the load is supplied through the shaft 2 or by the servo-motor 19, if the load reaction becomes excessive the shaft 10 and hence the drums 11 and 12 are caused to rotate oppositely to the controlled direction. For example, with the crank rotated in the direction of the arrow the drums 11 and 12 rotate counterclockwise and clockwise, respectively, as indicated by the arrows in Fig. 2, and the bias of the arm 16 is counterclockwise, as above pointed out. Therefore the rotating surfaces of the drums tend to repel the wedge 17, although the centralizing springs actually hold them out of contact under normal load, and no braking action occurs. When there is a "kick-back" sufficient to reverse the direction of rotation of the drums, the torque will flex both spring arms sufficiently to allow the shoe to contact the surfaces of the drums and then the surfaces cooperate with the bias of the arm 16 to draw the shoe 17 into wedging relation. The same thing occurs with shoe 18 when the drive is in the opposite direction.

While the movement of the driven member is referred to as rotation, it will be understood that the invention is applicable to linear as well as angular movement. Also it will be understood that while the response device is shown as the spider of a differential, other forms will suggest themselves, it being only necessary for the successful embodiment of the invention that the locking devices be responsive to the reaction of the driven member. Manifestly also the use of a servo-motor or follow-up to multiply the power is optional. In short it is obvious that modifications may be made in the particular construction shown without departing from the scope of the invention as pointed out in the appended claims.

I claim:

1. A drive comprising a driving shaft and a driven shaft, a differential one element of which is connected to the driving shaft and a second element of which is connected to the driven shaft, a drum secured to the second element of the differential, a second drum secured to the driven shaft and adapted to rotate in a direction opposite to that of the first drum, the two drums being positioned and spaced oppositely from each other on parallel shafts, a locking device operable between the two drums, and actuating means for the locking device connected to a third element of the differential.

2. A drive comprising a driving shaft and a driven shaft, a differential one element of which is connected to the driving shaft and a second element of which is connected to the driven shaft, a drum secured to the second element of the differential, a second drum secured to the driven shaft and adapted to rotate in a direction opposite to that of the first drum, the two drums being positioned and spaced oppositely from each other on parallel shafts, an arm member connected to a third element of the differential, and two wedge members on the arm member pointed toward each other and adapted to engage the drums alternatively in accordance with the direction of movement of the arm member, said wedge members being adapted to prevent further rotation of the drums when the direction of movement of the engaging wedge is the same as the direction of movement of the engaged surface of the drums.

3. A drive comprising a driving shaft and a driven shaft, a differential one element of which is connected to the driving shaft and a second element of which is connected to the driven shaft, a drum secured to the second element of the differential, a second drum secured to the driven shaft and adapted to rotate in a direction opposite to that of the first drum, the two drums being positioned and spaced oppositely from each other on parallel shafts, an arm member connected to a third element of the differential, two wedge members on the arm member pointed toward each other and adapted to engage the drums alternatively in accordance with the direction of movement of the arm member, said wedge members being adapted to prevent further rotation of the drums when the direction of movement of the engaging wedge is the same as the direction of movement of the engaged surface of the drums, a prime mover connected to the driven shaft and means associated with the arm member for controlling the prime mover.

4. A drive comprising a driving shaft and a driven shaft, a differential one element of which is connected to the driving shaft and a second element of which is connected to the driven shaft, a drum secured to the second element of the differential, a second drum secured to the driven shaft and adapted to rotate in a direction opposite to that of the first drum, the two drums being positioned and spaced oppositely from each other on parallel shafts, an arm member connected to a third element of the differential, two wedge members on the arm member pointed toward each other and adapted to engage the drums alternatively in accordance with the direction of movement of the arm member, said wedge members being adapted to prevent further rotation of the drums when the direction of movement of the engaging wedge is the same as the direction of movement of the engaged surface of the drums, a motor connected to the driven shaft, and contacts operable by the arm member for controlling the motor.

5. In a drive comprising a movable driving member and a driven member movable in accordance with the movement of the driving member, a brake drum connected to the driven member, a brake arm associated with the brake drum, two brake shoes mounted on the arm and adapted to engage the drum separately in accordance with the direction of movement of the arm, said brake shoes being adapted to prevent further rotation of the drum when the direction of movement of the engaging brake shoe is the same as the direction of movement of the engaged surface of the drum, and means to directionally move the brake arm in accordance with the reaction torque of the driven member.

6. In a drive comprising a movable driving member and a driven member movable in accordance with the movement of the driving member, a differential, one element of which is connected to the driving member and a second element of which is connected to the driven member, a brake drum connected to the second element of the differential, a brake arm mounted concentric with the brake drum and connected to a third element of the differential, and two brake shoes mounted on the arm adapted to engage the drum separately in accordance with the direction of movement of the arm, said brake shoes being adapted to prevent further rotation of the drum when the direction of movement of the engaging brake shoe is the same as the direction of movement of the engaged surface of the drum.

7. In a drive comprising a movable driving member and a driven member movable in accordance with the movement of the driving member, a differential, one element of which is connected to the driving member and a second element of which is connected to the driven member, a brake drum connected to the second element of the differential, a brake arm mounted concentric with the brake drum and connected to a third element of the differential, two brake shoes mounted on the arm adapted to engage the drum separately in accordance with the direction of movement of the arm, said brake shoes being adapted to prevent further rotation of the drum when the direction of movement of the engaging brake shoe is the same as the direction of movement of the engaged surface of the drum, a prime mover connected to the driven member and means associated with the arm for controlling the prime mover.

8. In a drive comprising a movable driving member and a driven member movable in accordance with the movement of the driving member, a differential, one element of which is connected to the driving member and a second element of which is connected to the driven member, a brake drum connected to the second element of the differential, a brake arm mounted concentric with the brake drum and connected to a third element of the differential, two brake shoes mounted on the arm adapted to engage the drum separately in accordance with the direction of movement of the arm, said brake shoes being adapted to prevent further rotation of the drum when the direction of movement of the engaging brake shoe is the same as the direction of movement of the engaged surface of the drum, and means associated with the brake arm to normally hold the brake shoes disengaged with the drum.

9. In a drive comprising a movable driving member and a driven member movable in accordance with the movement of the driving member, a differential, one element of which is connected to the driving member and a second element of which is connected to the driven member, a brake drum connected to the second element of the differential, a brake arm mounted concentric with the brake drum and connected to a third element of the differential, two brake shoes mounted on the arm adapted to engage the drum separately in accordance with the direction of movement of the arm, said brake shoes being adapted to prevent further rotation of the drum when the direction of movement of the engaging brake shoe is the same as the direction of movement of the engaged surface of the drum, and means associated with the brake arm to normally hold the brake shoes disengaged with the drum, said means including yieldable members adapted to permit engagement of one of the shoes with the drum when the torque from the driven member exceeds a predetermined amount.

WILLIAM H. NEWELL.